Patented Nov. 14, 1922.

1,435,891

UNITED STATES PATENT OFFICE.

NIELS C. CHRISTENSEN, OF SALT LAKE CITY, UTAH.

PROCESS OF TREATING LEAD-ZINC SULPHIDE ORES.

No Drawing. Original application filed October 13, 1919, Serial No. 330,320. Divided and this application filed April 21, 1920. Serial No. 375,492.

*To all whom it may concern:*

Be it known that I, NIELS C. CHRISTENSEN, a citizen of the United States, residing at Salt Lake City, in the county of Salt Lake and State of Utah, have invented a certain new and useful Process of Treating Lead-Zinc Sulphide Ores, of which the following is a specification.

This invention relates to the treatment of lead-zinc sulphide ores. My process is a combination of the processes of treating galena ores described in my applications Serial Nos. 327,400 and 327,401 and the process of treating zinc sulphide ores described in my application Serial No. 327,402.

The process consists in treating the comminuted ore or concentrate with a hot concentrated chloride solution containing acid or ferric chloride, by which treatment the lead and silver from the lead and silver sulphides are dissolved as chlorides, and the sulphur given off as $H_2S$ or metallic sulphur as shown below:

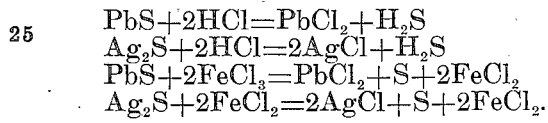

The ferrous chloride formed by the reduction of the ferric chloride in dissolving the lead and silver is readily regenerated as noted in the method of precipitation later described.

The hot solution containing the lead and silver is filtered away from the zinc blende, pyrite and gangue material, and the silver is preferably precipitated therefrom with metallic lead and the lead either by cooling or by electrolysis, or by a combination of both. The hot chloride solutions dissolve a much larger amount of lead chloride than the cold solutions, and the lead chloride may be separated from the chloride solution by taking advantage of this fact.

Such a proportion of solution to ore may be used that a hot concentrated solution of lead chloride is secured by the before described treatment. This solution is filtered away from the ore and then cooled and the lead chloride precipitated and separated from the cold solution. The precipitation of the lead by electrolysis is preferably used when dissolving solution contains ferric chloride, and the ferrous chloride thus formed is regenerated by the chlorine given off in the electrolysis. The chloride solution may be electrolyzed with an insoluble anode in a cell with a diaphragm separating the cell into the anode and cathode compartments. The ferrous solution containing the lead chloride is led first into the cathode compartment where the lead is precipitated, and then into the anode compartment where the ferrous chloride is changed to ferric chloride by the chlorine as indicated below:

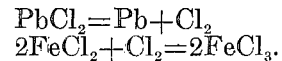

The precipitated lead chloride may also be melted and electrolyzed to secure lead bullion and chlorine. The chlorine thus secured is led into the ferrous solution where it unites with the ferrous chloride to form ferric chloride thus regenerating the dissolving solution.

The hot acid chloride solution or the hot chloride solution containing ferric chloride acts very rapidly on the galena and has comparatively little effect on the blende due to the limited solubility of zinc chloride in the chloride solutions. It is therefore possible to secure a practically complete extraction of the lead with but very little action on the blende if a very little excess of acid or ferric chloride over the amount necessary to bring the lead into solution is used. The solutions containing the ferric chloride are preferable in this respect to the acid solutions. As the chloride solution is used over and over again in the process it very soon becomes saturated with the limited quantity of zinc chloride which it will hold, and therefore acts but very little upon the blende.

The residue from this lead treatment, if rich enough in zinc, may be treated by the ordinary roasting and zinc smelting methods, but in most cases it will pay to treat this residue for the recovery of the zinc as outlined below:

The residue from the lead treatment, which contains the blende, pyrite, etc. and silicious gangue material, is treated with hot concentrated sulphuric acid which dissolves the zinc as a sulphate but has very little action on the pyrite or chalcopyrite. As noted in my patent application Serial No. 327,402 the action of the hot acid upon the blende differs with the strength of acid and the temperature. The dissolving of the zinc should preferably be carried out with the acid solution near its boiling point, and sufficient acid should be used to dissolve the zinc sulphate, as if the acid is used in entirely too small an amount there is very little action upon some of the zinc sulphide even with 98% $H_2SO_4$. Acids of strength of 50% $H_2SO_4$ and less do not act rapidly on the blende; 60% acid acts rapidly, driving the sulphur off as $H_2S$. Acids between 75% and 85% give $H_2S$ and some sulphur, the amount of sulphur increasing with the concentration of the acid. The stronger acids, 95% and 98%, give sulphur and $SO_2$. The reactions are indicated below:

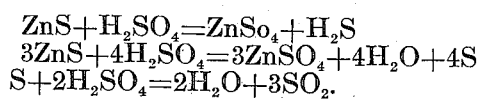

The rapidity of the action increases with the concentration of the acid. The amount of action upon the pyrite also increases with the concentration of the acid. The iron sulphide combined with the zinc sulphide goes into solution with the zinc as ferrous sulphate. As described in my application Serial No. 327,402 the hot sulphuric acids all hold a much larger amount of zinc sulphate in solution than the cold acid, the cold acids between 60% and 95% holding practically the same amount. The separation of the zinc sulphate from the concentrated acid solution is secured by taking advantage of this difference in solubility of the zinc sulphate in the hot and cold acid. Such a proportion of acid to zinc in the ore is used that a hot concentrated solution of zinc sulphate is secured. This pregnant solution is separated from the residue of ore and cooled, thus precipitating the zinc sulphate. The cold acid is then re-heated and used for the treatment of more ore. As also noted in this application the more concentrated the acid the larger the amount of zinc the hot acid will hold. It is therefore advantageous to use more concentrated acid in order to keep down the volume of acid used. As before noted, however, the amount of iron which is brought into solution from the pyrite or chalcopyrite also increases with the concentration of the acid, and as noted in my application Serial No. 327,402 the zinc sulphate precipitated from the more concentrated acids is less readily handled than the precipitate from the more dilute solutions. Higher temperatures must also be used with the more concentrated acids to secure the more concentrated zinc solutions, and the difficulties of mechanical construction and operation are also increased with the acids of higher concentration. From the foregoing it will be apparent that the concentration of acid used will depend upon the character of the ore and the products desired. If the sphalerite is practically free from combined iron, and it is desired to make a pure zinc sulphate 60% to 70% acid would probably be used in order to avoid any action on the pyrite. If the blende contains considerable iron the more concentrated acids might be used since the zinc sulphate would be contaminated with the ferrous sulphate from the iron in the blende, and a small additional amount of iron from the pyrite would not be so objectionable as in the previous case.

The residue from the two foregoing treatments which contains pyrite, chalcopyrite and siliceous gangue material, is especially well suited to the recovery of the sulphides therefrom by flotation, and a practically complete recovery of these in a very clean concentrate is readily made.

By the above treatments practically all the lead and the silver in the galena may be recovered in very pure products, and most of the zinc may be recovered as a high grade zinc sulphate. Only a small amount of zinc is brought into solution as a chloride in the lead treatment, and when acid chloride solutions are used this may be recovered by precipitation with lime, though this precipitation would be more valuable for cleaning the solution than for the zinc recovered. The pyrite and chalcopyrite of the ore (with the gold, silver and copper in them) are also recovered in a high grade concentrate.

My process has given excellent results on complex ores which have yielded to none of the ordinary methods of treatment, and is therefore a very valuable improvement in the treatment of lead-zinc sulphide ores, which has so long been an unsolved problem in metallurgy.

As it is obviously impossible to give the many minor variations of treatment in the practical application of my process to different ores under different conditions, I do not desire to be entirely limited by the foregoing brief description but by the appended claims.

This application is a division of my application Serial No. 330,320, filed on or about October 13, 1919.

Having described my process what I claim and desire to patent is:

1. The process of treating zinc-lead sulphide ores and concentrates, which consists in treating the comminuted ore with a hot acid concentrated chloride solution, thereby dissolving the lead and silver in the galena as chlorides, separating the pregnant chloride solution from the residue of ore, and precipitating the lead therefrom by electrolysis, treating the residue of ore from the foregoing treatment with hot concentrated sulphuric acid, thereby dissolving the zinc as a sulphate, separating the hot pregnant acid solution from the remainder of the ore, and cooling said solution and precipitating zinc sulphate therefrom.

2. The process of treating zinc-lead sulphide ores and concentrates, which consists in treating the comminuted ore with a hot concentrated chloride solution, containing ferric chloride, thereby dissolving the lead as a chloride, and reducing the ferric chloride to the ferrous condition, separating the pregnant chloride solution from the remainder of the ore, and precipitating the lead therefrom by electrolysis, and using the chlorine thus generated for changing the before mentioned ferrous iron to the ferric condition, and using last said ferric solution for the treatment of more ore, treating the residue of ore from said foregoing treatment with hot concentrated sulphuric acid, thereby dissolving the zinc as a sulphate, separating the hot pregnant solution from the remainder of the ore, and cooling said solution, and precipitating zinc sulphate therefrom.

In testimony whereof I have signed my name to this specification.

NIELS C. CHRISTENSEN.